United States Patent
Johnson et al.

(10) Patent No.: US 10,407,047 B2
(45) Date of Patent: Sep. 10, 2019

(54) VEHICLE CONTROL SYSTEM WITH TARGET VEHICLE TRAJECTORY TRACKING

(71) Applicant: MAGNA ELECTRONICS INC., Auburn Hills, MI (US)

(72) Inventors: Nathaniel S. Johnson, Royal Oak, MI (US); Gayatri U. Powar, Maharashtra (IN)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 244 days.

(21) Appl. No.: 15/369,921

(22) Filed: Dec. 6, 2016

(65) Prior Publication Data

US 2017/0158197 A1 Jun. 8, 2017

Related U.S. Application Data

(60) Provisional application No. 62/263,888, filed on Dec. 7, 2015.

(51) Int. Cl.
*B60W 10/20* (2006.01)
*B60W 10/18* (2012.01)
*B60W 30/095* (2012.01)

(52) U.S. Cl.
CPC ............ *B60W 10/20* (2013.01); *B60W 10/18* (2013.01); *B60W 30/095* (2013.01); *B60W 30/0953* (2013.01); *B60W 30/0956* (2013.01); *B60W 2520/10* (2013.01); *B60W 2520/14* (2013.01); *B60W 2550/302* (2013.01); *B60W 2550/304* (2013.01); *B60W 2550/306* (2013.01)

(58) Field of Classification Search
CPC ..................................................... B60W 10/20
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 8,694,224 B2 | 4/2014 | Chundrlik, Jr. et al. |
| 9,090,234 B2 | 7/2015 | Johnson et al. |
| 9,205,776 B2 | 12/2015 | Turk |
| 9,260,095 B2 | 2/2016 | Chundrlik, Jr. et al. |
| 9,346,468 B2 | 5/2016 | Chundrlik, Jr. et al. |
| 9,547,795 B2 * | 1/2017 | Gupta ................ G06K 9/00805 |
| 9,630,625 B2 * | 4/2017 | Shin ...................... B60W 30/16 |

(Continued)

*Primary Examiner* — Truc M Do
(74) *Attorney, Agent, or Firm* — Honigman LLP (57) ABSTRACT

A driver assistance system of an equipped vehicle includes at least one camera disposed at the equipped vehicle so as to have a field of view exterior of the equipped vehicle. A control has an image processor operable to process frames of image data captured by the camera. The image processor processes frames of captured image data to determine a target vehicle present in the field of view of the camera and to determine motion of the determined target vehicle relative to the equipped vehicle. The control, responsive to processing frames of captured image data via the image processor, determines a path of travel of the determined target vehicle relative to the equipped vehicle as the equipped vehicle is moving. The control translates the determined motion of the target vehicle to a local coordinate system of the equipped vehicle.

20 Claims, 4 Drawing Sheets

FIG. 1

(56) References Cited

U.S. PATENT DOCUMENTS

| | | |
|---|---|---|
| 9,988,047 B2 | 6/2018 | Johnson et al. |
| 10,055,651 B2 | 8/2018 | Chundrlik, Jr. et al. |
| 2010/0253542 A1* | 10/2010 | Seder ................. G01S 7/22 340/932.2 |
| 2010/0259615 A1* | 10/2010 | Yamamoto ............. B60R 1/00 348/148 |
| 2012/0062743 A1* | 3/2012 | Lynam ................ B60Q 9/005 348/148 |
| 2012/0170808 A1* | 7/2012 | Ogata ............. B60R 21/0134 382/103 |
| 2013/0141578 A1* | 6/2013 | Chundrlik, Jr. ........ H04N 7/181 348/148 |
| 2015/0266422 A1 | 9/2015 | Chundrlik, Jr. et al. |
| 2016/0101779 A1* | 4/2016 | Katoh ................. G06T 7/20 340/435 |
| 2016/0162743 A1 | 6/2016 | Chundrlik, Jr. et al. |
| 2016/0231133 A1 | 8/2016 | Johnson et al. |

* cited by examiner

VEHICLE CONTROL SYSTEM WITH TARGET VEHICLE TRAJECTORY TRACKING

CROSS REFERENCE TO RELATED APPLICATION

The present application claims the filing benefits of U.S. provisional application Ser. No. 62/263,888, filed Dec. 7, 2015, which is hereby incorporated herein by reference in its entirety.

FIELD OF THE INVENTION

The present invention relates generally to a vehicle driver assistance system for a vehicle and, more particularly, to a vehicle driver assistance system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and a control, responsive to processing of captured image data (and/or other data captured by a sensor or sensors of the vehicle), determines the presence and motion of a target vehicle in the field of view/sensing of the sensor, and determines the path of travel of the other target vehicle relative to the current location of the equipped vehicle as the equipped vehicle moves along its own path of travel. The control translates the determined location and motion of the target vehicle to a local coordinate system of the equipped vehicle so that the path of travel of the target vehicle is relative to the path of travel of the equipped vehicle.

Self-driving vehicles will require multiple methods of determining the appropriate trajectory to follow. Depending on the driving situation, there may be limited information available on how to navigate. The motion of other vehicles can indicate an available trajectory for the subject vehicle to take. The techniques of the present invention enable recording the trajectory that one or more target vehicles have traveled. This trajectory is updated continuously based on the motion of the subject vehicle to remain accurate to the subject vehicle's relative frame of reference. These techniques can utilize vehicle dynamics sensors data or information such as yaw rate and vehicle speed. Included in these techniques is correcting for noise in the sensors to allow for better vehicle tracking. Linking data from multiple disparate sensing technologies can reduce the errors associated with determining the trajectory of the subject and target vehicles. This data can be used to enhance the operation of many automotive features, such as, for example, traffic jam assist, highway pilot, automated taxi service, and/or the like.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
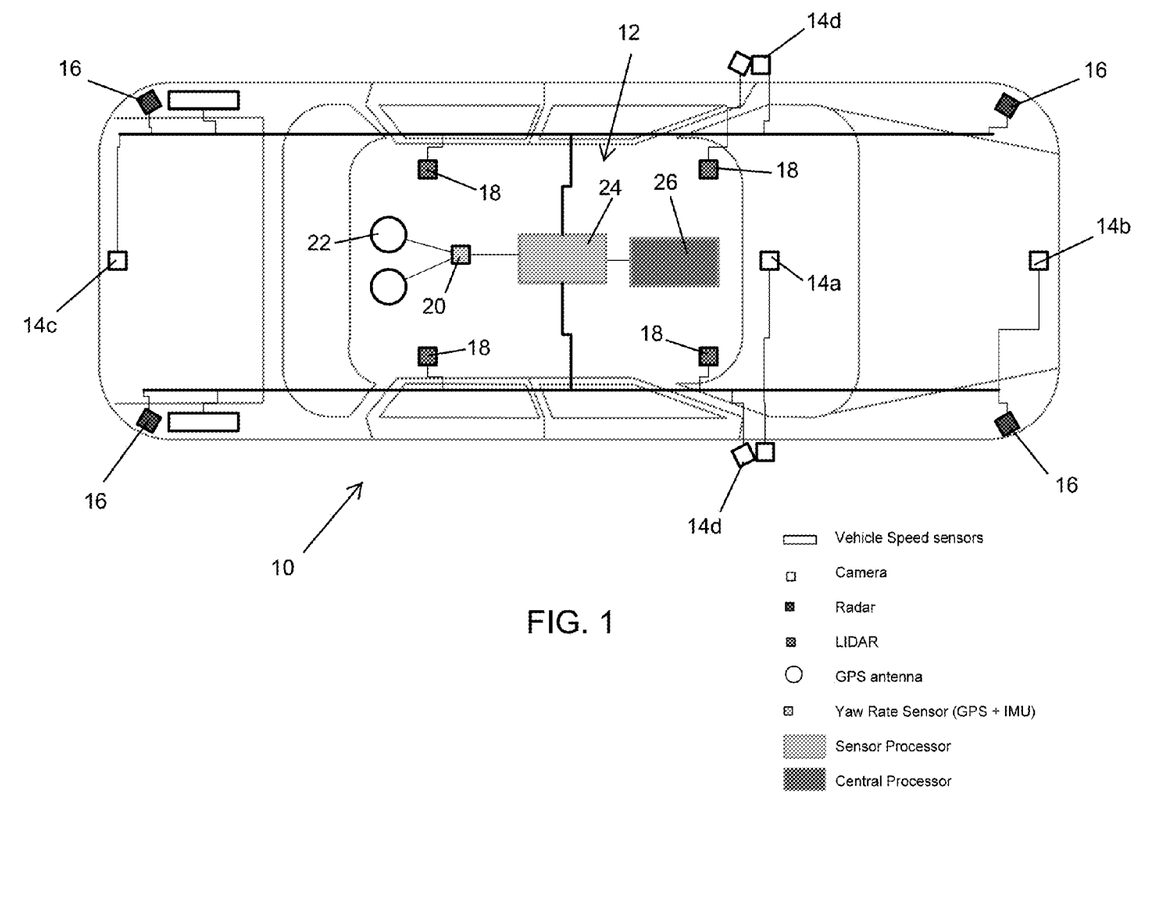
FIG. 1 is a plan view of a vehicle with a control system that incorporates cameras and/or other sensors in accordance with the present invention.
Figure 2:
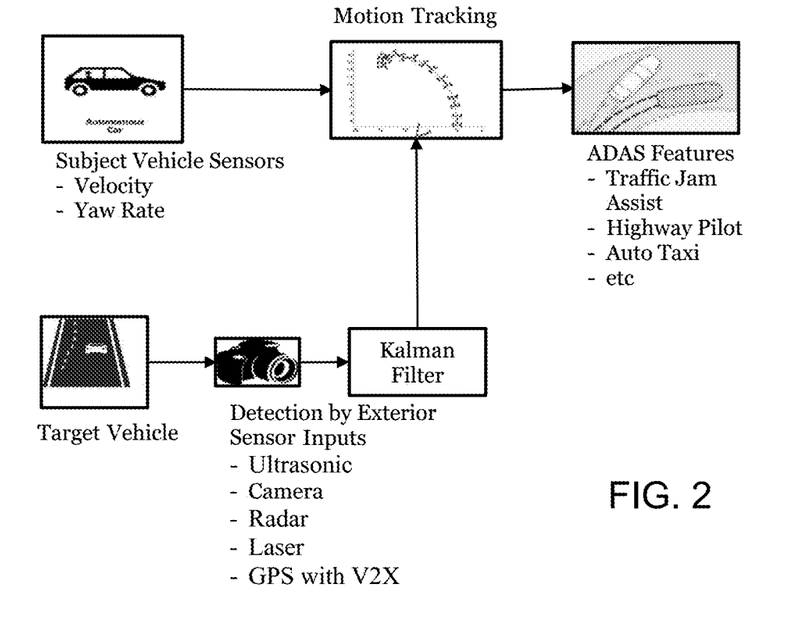
FIG. 2 is a schematic of the system of the present invention.

Referring now to the drawings and the illustrative embodiments depicted therein, a vehicle 10 (FIG. 1) includes a control system 12 that includes at least one exterior facing imaging sensor or camera, such as a forward facing camera 14a at the windshield of the vehicle and/or a forward facing camera 14b at a forward portion of the vehicle, and a rearward facing imaging sensor or camera 14c at the rear of the vehicle, and one or more sidewardly/rearwardly facing cameras 14d at respective sides of the vehicle, which capture images or image data exterior of the vehicle, with the cameras each having a lens for focusing images at or onto an imaging array or imaging plane or imager of the camera. The forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The system 12 includes other sensors, such as a radar sensor or sensors 16, a lidar sensor or sensors 18 and/or a yaw rate sensor 20. A GPS system and antenna 22 is also included in the control system. The control system includes a sensor processor 24 and central processor 26. The sensor processor may process image data captured by the camera or cameras and sensor data captured or generated by the other sensors, such as to detect objects or the like. The data transfer or signal communication from the camera to the ECU may comprise any suitable data or communication link, such as a vehicle network bus or the like of the equipped vehicle.

The basis of the system of the present invention is to store a target vehicle's positions in history. These positions are recorded relative to the subject vehicle responsive to data captured by one or more sensors of the subject or equipped vehicle. A coordinate transform may be applied to transfer the recorded positions to a global reference. For the purpose of the methods described below, these positions are instead constantly updated so that they remain in the subject vehicle's local coordinate system even as the subject vehicle moves. This system may operate independently without other object or feature tracking methods. For example, this system does not rely on lane markings, road textures, GPS location or high definition maps. Also, additional SLAM (Simultaneous Localization and Mapping) techniques are not necessary. However, this system can be used in conjunction with those techniques for additional information and redundancy. The resulting trajectory that can be generated from the recorded points can be used by a self-driving feature's lateral motion controller or other features.

The input from the subject vehicle's sensors may require noise filtering and correction (such as by utilizing aspects of the systems described in U.S. Pat. No. 8,694,224, which is hereby incorporated herein by reference in its entirety).

A Kalman filter is used to predict states of the system and measurements are used to update these predictions. A discrete time Kalman filter is described for use with the methods here to estimate the system states. The target vehicle is modelled as a system with a 4 dimensional vector [dx, dy, Vx, Vy] where dx, dy are the longitudinal and lateral relative positions of the target vehicle (relative to the subject vehicle) and Vx, Vy are the longitudinal and lateral relative velocities of the target vehicle (relative to the subject vehicle).

A tuning process is used to optimize the Kalman filter for fast convergence utilizing known techniques. For example, the measurement noise covariance R is a calibratable value which can be pre-calculated offline. Another embodiment can have the R value determined in real time. A large number of readings of a known ground truth state are taken, from which the variance(s) can be calculated. This matrix is kept constant and matrix Q is varied.

For the purpose of the methods described herein, the history positions are stored in a FIFO (First In First Out) queue. A number of positions are stored so a trajectory can be generated even at high speeds or when the target vehicle is far away, for calibratable number of positions, such as, for example, 100 positions or thereabouts. To make sure these positions are meaningful, and not clustered together, a position is recorded only when it is at least a calibratable minimum distance from the previously recorded position, such as, for example, about 0.5 meters from the previously recorded position. The oldest positions are removed from the buffer when the maximum buffer size is reached.

When this data is collected or discarded can be determined by various factors, specific to the needs of the features being supported by this system. For example, the data buffer can be reset when the target vehicle is no longer detected by the sensors. Also, data may be collected as soon as a target vehicle is detected and stored even if it is not currently being immediately consumed or used by another feature. For example, the system may be used in an autonomous vehicle to track a preceding vehicle's trajectory constantly. In normal operation, the autonomous vehicle would be using other information such as lane markings or GPS points to control its steering, but if that information was suddenly lost (such as when dirt or snow may cover lane markings on the road or in close traffic jam driving situations where the vehicle ahead of the subject vehicle interferes with the system's ability to view the lane markers), then the system may switch over to following the preceding vehicle's trajectory as a form of degraded operation. Optionally, in a traffic jam driving situation, the information pertaining to the preceding vehicle's trajectory may be the primary form of steering control of a steering system of the equipped vehicle (and optionally for controlling a braking system of the equipped vehicle and an accelerator system of the equipped vehicle) to either follow the determined relative path of travel of the target vehicle or to avoid the target vehicle when the system determines that the relative path of travel of the target vehicle may interfere with or intercept the current path of travel of the equipped vehicle.

Figure 3:
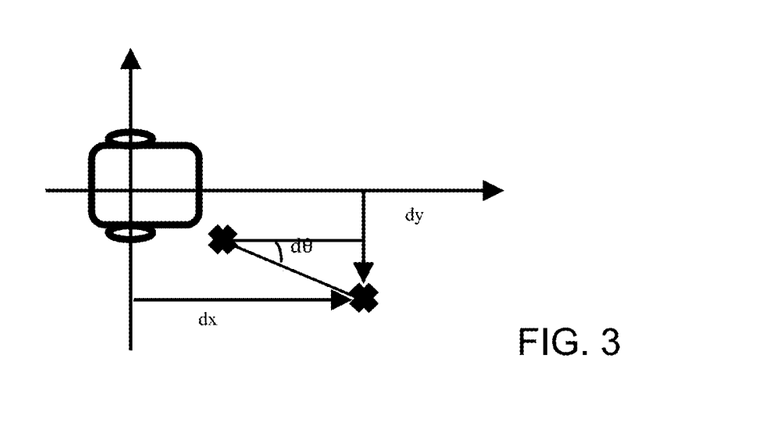
FIG. 3 is a schematic showing the angle and coordinate system of a target vehicle relative to the subject vehicle in accordance with the present invention.

The buffer stores the following information about the leading or target vehicle (see FIG. 3).
  dx=relative longitudinal position from target vehicle,
  dy=relative lateral position from target vehicle, and
  dθ=mathematical slope between two consecutive points in buffer.

Figure 4:
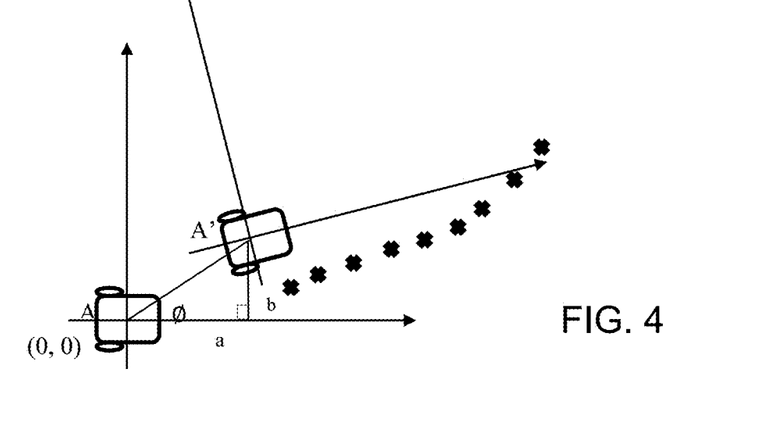
FIGS. 4-6 are schematics showing motion of the target vehicle and transformation of the motion points in accordance with the present invention.
Figure 5:
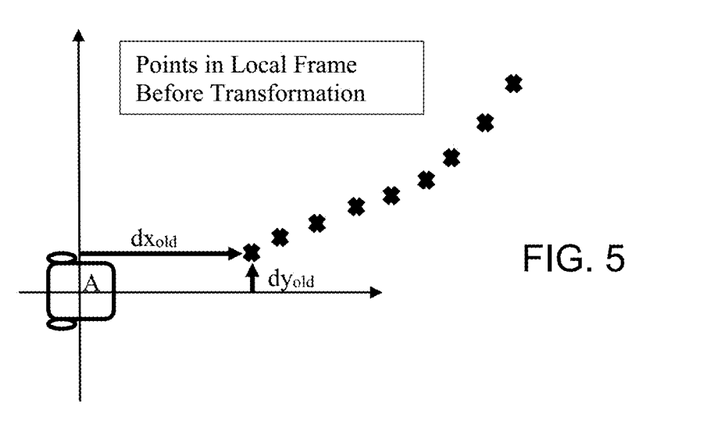
Figure 6:
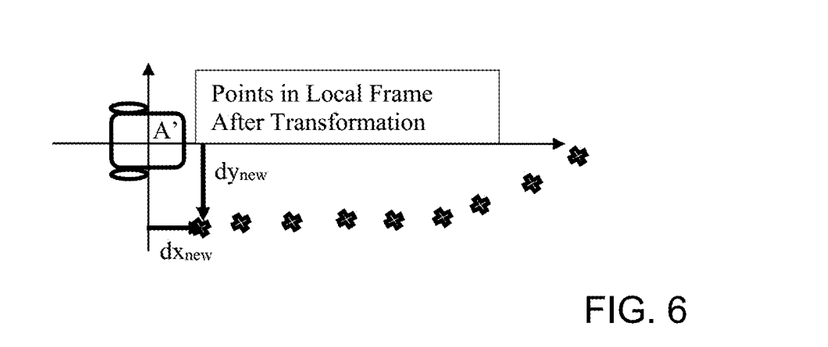

Motion Tracking is responsible for generating a trajectory that the target vehicle will follow. Before the new point is recorded at a time instant, the target vehicle history buffer data is updated based on the subject vehicle's motion. With reference to FIGS. 4-6, at the time instance t, if the subject vehicle is at position A, then at next time instant t+1, the subject vehicle will move to a position A' (FIG. 4). The position update can be performed when another position is added from the latest sensor input or the system references the vehicle's position history. The sensor provides the following inputs by tracking the target vehicle: relative longitudinal position dx and relative lateral position dy.

To resolve the relative position data with the motion of the subject vehicle, the system translates the old position data $(dx_{old}, dy_{old})$ to the new coordinates $(dx_{new}, dy_{new})$ in the new reference system. For the purpose of the methods described herein, this motion will be determined from the subject vehicle's velocity and yaw rate. The origin of subject vehicle shifts to (a, b) in single time step with a rotation of angle ø. This motion and resulting transformation is shown in FIGS. 4-6.

This is calculated as follows:
$$a = Vx * \Delta t$$
$$b = Vy * \Delta t$$
$$\emptyset = \dot{\psi} * \Delta t$$

where:
  Vx=Longitudinal velocity of subject vehicle Vy=Lateral velocity of subject vehicle
  $\dot{\psi}$=Yaw Rate of subject vehicle Δt=Sample time
  Another embodiment can use subject vehicle acceleration from the subject vehicle's inertial measurement unit (IMU).

All previous target vehicle position coordinate values in the buffer are transformed using following relations:

$$dx_{new} = (dx_{old} - a) * \cos\emptyset + (dy_{old} - b) * \sin\emptyset$$

$$dy_{new} = -1 * (dx_{old} - a) * \sin\emptyset + (dy_{old} - b) * \cos\emptyset$$

$$d\theta = \tan^{-1} \frac{\Delta dy_{new}}{\Delta dx_{new}}$$

where $\Delta dy_{new}$ and $\Delta dx_{new}$ is the difference of the lateral and longitudinal positions of two consecutive points in the buffer.

There are many possible outputs from the motion tracking module. For example, the module or system can output information about a point on the trajectory ahead for a lateral control module to use to steer the subject vehicle. Optionally, for example, the outputs may be dy (lateral error from required trajectory), r (heading angle) and K (trajectory curvature). The target reference point on the trajectory is selected from the buffer based on the velocity of the subject vehicle to calculate a relative position ahead from a predetermined look ahead time, such as, for example, a look ahead time of about 0.5 seconds. If a point at the look ahead time does not exist then the farthest point ahead will be used instead. The dy and dθ are chosen corresponding to this point. The angle dθ corresponds to the heading angle r at the target reference point.

Different methods can be used to determine curvature, such as by using linear approximations and calculus methods, or finding a radius of a curve using three points along the curve or using two points along the curve and a tangent line at the curve, as discussed below.

Using Linear Approximations and Calculus Methods:

Let $(x_1, y_1)$, $(x_2, y_2)$ and $(x_3, y_3)$ be the coordinates of point P1, P2 and P3 respectively.

$$\frac{dy}{dx}$$

is calculated using:
m1=Slope joining point 1 and 2
m2=Slope joining points 2 and 3

$$\frac{dy}{dx} = \text{average of these slopes}$$

The second derivative of slope is approximated as $$\frac{\Delta m}{\Delta x} = \frac{m2 - m1}{\frac{(x2+x1)}{2} - \frac{x3+x2}{2}} \sim \frac{d^2 y}{dx^2}$$

$$\text{Trajectory Radius } R = \frac{\left[1 + \left(\frac{dy}{dx}\right)^2\right]^{3/2}}{\left|\frac{d^2 y}{dx^2}\right|}$$

$$K = \frac{1}{R}$$

Figure 7:
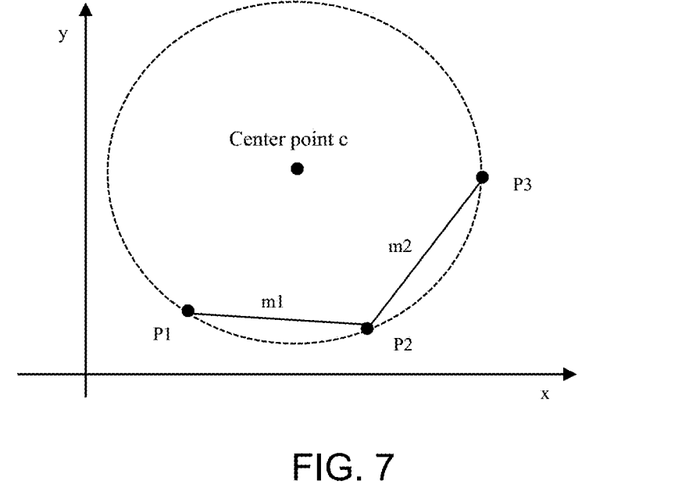
FIG. 7 is a graph of a circle for determining curvature using linear approximations and calculus methods in accordance with the present invention.

Finding the Radius of the Circle using 3 Points:

Let $(x_1, y_1)$, $(x_2, y_2)$ and $(x_3, y_3)$ be the coordinates of point P1, P2 and P3 respectively (see FIG. 7).

The center of the circle at point (xc, yc) is:

$$xc = \frac{m1 m2 (y_1 - y_3) + m2(x_1 + x_2) - m1(x_2 + x_3)}{2(m2 - m1)}$$

$$yc = -\frac{1}{m1}\left(xc - \frac{x_1 + x_2}{2}\right) + \frac{y_1 + y_2}{2}$$

And the trajectory radius is found using this center and any one point using distance formula:

$$\text{Trajectory Radius } R = \sqrt[2]{(xc - x_1)^2 + (yc - y_1)^2}$$

$$K = \frac{1}{R}$$

Figure 8:
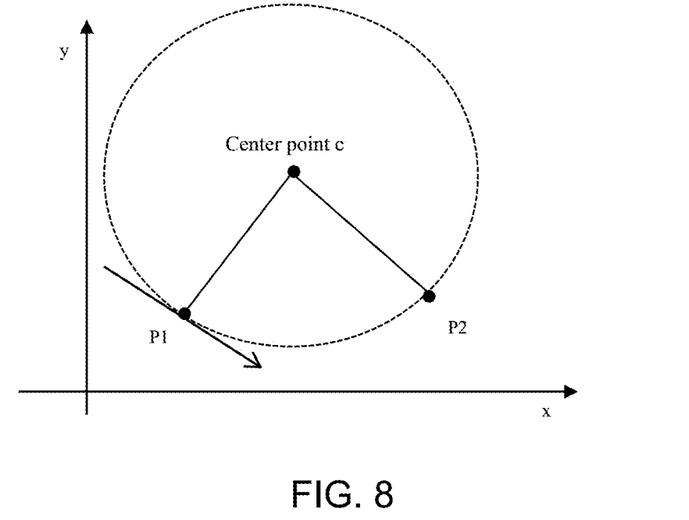
FIG. 8 is a graph of another circle for determining curvature using two points on the circle and a tangent in accordance with the present invention.

Curvature from Two Points and a Tangent:

Consider two points as P1 and P2 (see FIG. 8). The line from center of circle to P1 at the tangent is perpendicular to the tangent. The center will be equidistant from P1 and P2.

The equation of the tangent line is ax+by=c, where a=−m1 (Slope at point P1), b=1, c=$ax_1+by_1 \cdot (x_1, y_1)$ and $(x_2, y_2)$ are the coordinates of point P1 and P2 respectively.

The equation of the perpendicular line passing through P1 is:

$$bx - ay = bx_1 - ay_1$$

The equation of a line that is perpendicular to the line joining P1 and P2 and that passes through the midpoint of that line is:

$$(x_1 - x_2)x + (y_1 - y_2)y = \tfrac{1}{2}*(x_1^2 + y_1^2 - x_2^2 - y_2^2)$$

The solution of this equation can be gained by standard methods. For example, using Cramer's rule:

$$\text{Coefficient Matrix } D = \begin{bmatrix} b & -a \\ (x_1 + x_2) & (y_1 + y_2) \end{bmatrix}$$

$$X - \text{matrix } Dx = \begin{bmatrix} bx_1 - ay_1 & -a \\ \frac{1}{2}*(x_1^2 + y_1^2 - x_2^2 - y_2^2) & (y_1 - y_2) \end{bmatrix}$$

$$Y - \text{matrix } Dy = \begin{bmatrix} b & bx_1 - ay_1 \\ (x_1 - x_2) & \frac{1}{2}*(x_1^2 + y_1^2 - x_2^2 - y_2^2) \end{bmatrix}$$

The center is at point (xc, yc):

$$xc = \frac{|Dx|}{|D|} \quad yc = \frac{|Dy|}{|D|}$$

And the trajectory radius is found using this center and any one point using distance formula:

$$\text{Trajectory Radius } R = \sqrt[2]{(xc - x_1)^2 + (yc - y_1)^2}$$

$$K = \frac{1}{R}$$

Finally, for the purpose of smoothing the output of the motion tracking module, other points in the buffer may be used beyond those in the methods described above. For example, the relative heading can be an average of the recorded headings between the selected point ahead and all the closer points.

Therefore, the present invention includes sensors (such as image sensors or cameras and/or radar sensors and/or lidar sensors) to capture data and a processor processes captured data to determine the presence and movement of another vehicle (such as another vehicle ahead of the subject vehicle and traveling along the same road as the subject vehicle).

The system tracks the other vehicle and determines the movement or path of the other vehicle relative to the subject vehicle. This is done by translating the actual location coordinates of the determined other vehicle to a local coordinate system of the subject vehicle (where the subject vehicle's current location is always the origin of the coordinate system, with the origin moving with the subject vehicle). The system determines the path of travel of the other vehicle relative to the subject vehicle, and can use this information when autonomously or semi-autonomously controlling the subject vehicle to follow the determined other vehicle.

The system may utilize sensors, such as radar or lidar sensors or the like. The sensing system may utilize aspects of the systems described in U.S. Pat. Nos. 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication No. US-2010-0245066 and/or U.S. provisional applications, Ser. No. 62/375,161, filed Aug. 15, 2016, Ser. No. 62/361,586, filed Jul. 13, 2016, Ser. No. 62/359,913, filed Jul. 8, 2016, Ser. No. 62/349,874, filed Jun. 14, 2016, Ser. No. 62/330,557, filed May 2, 2016, Ser. No. 62/313,279, filed Mar. 25, 2016, Ser. No. 62/303,546, filed Mar. 4, 2016, and/or Ser. No. 62/289,441, filed Feb. 1, 2016, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red / red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877, 897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A driver assistance system of a vehicle, said driver assistance system comprising:
    at least one camera configured to be disposed at a vehicle equipped with said driver assistance system so as to have a field of view exterior of the equipped vehicle;
    a control having an image processor operable to process frames of image data captured by said camera;
    wherein, with said at least one camera disposed at the equipped vehicle, said image processor processes frames of captured image data to determine a target vehicle present in the field of view of said camera and to determine motion of the determined target vehicle relative to the equipped vehicle;
    wherein said control, responsive to processing frames of captured image data via said image processor with said at least one camera disposed at the equipped vehicle, determines a path of travel of the determined target vehicle relative to the equipped vehicle as the equipped vehicle is moving;
    wherein said control translates the determined motion of the target vehicle to a local coordinate system of the equipped vehicle; and
    wherein said control controls the equipped vehicle to follow the determined path of travel of the target vehicle.

2. The driver assistance system of claim 1, wherein said control determines the relative path of travel of the determined target vehicle responsive to determined changes in location of the determined target vehicle relative to the equipped vehicle.

3. The driver assistance system of claim 1, wherein said control determines the relative path of travel of the determined target vehicle responsive to determined changes in speed of the determined target vehicle relative to the equipped vehicle.

4. The driver assistance system of claim 1, wherein said control controls the equipped vehicle to follow the determined path of travel of the target vehicle by controlling a steering system of the equipped vehicle, a braking system of the equipped vehicle and an accelerator system of the equipped vehicle.

5. The driver assistance system of claim 1, wherein said control controls the equipped vehicle to follow the determined path of travel of the target vehicle by controlling at least one selected from the group consisting of a steering system of the equipped vehicle, a braking system of the equipped vehicle and an accelerator system of the equipped vehicle.

6. The driver assistance system of claim 1, wherein said control updates the local coordinate system of the equipped vehicle as the equipped vehicle moves.

7. The driver assistance system of claim 6, wherein said control determines motion of the equipped vehicle via the equipped vehicle's velocity and yaw rate.

8. The driver assistance system of claim 1, wherein, responsive to processing frames of captured image data via said image processor with said at least one camera disposed at the equipped vehicle, said control updates the determined motion of the target vehicle to the local coordinate system of the equipped vehicle as both the target vehicle and the equipped vehicle move so the determined motion of the target vehicle remains in the local coordinate system as the equipped vehicle moves.

9. The driver assistance system of claim 1, wherein, responsive to processing frames of captured image data via said image processor with said at least one camera disposed at the equipped vehicle, said control determines a plurality of positions of the determined target vehicle along the determined path of travel of the determined target vehicle relative to the equipped vehicle as the equipped vehicle is moving, and wherein the plurality of positions are stored in memory so a trajectory of the determined target vehicle can be determined.

10. The driver assistance system of claim 9, wherein said control stores a position of the determined target vehicle only when the determined position of the target vehicle is at least a threshold distance from the previously stored position.

11. The driver assistance system of claim 1, wherein, responsive to the determined motion of the target vehicle translated to the local coordinate system, said control maneuvers the equipped vehicle to follow the determined target vehicle.

12. The driver assistance system of claim 1, wherein said control is operable to maneuver the equipped vehicle responsive to a GPS system, and wherein, responsive to loss of GPS system signal and responsive to the determined motion of the target vehicle translated to the local coordinate system, said control maneuvers the equipped vehicle to follow the determined target vehicle.

13. The driver assistance system of claim 1, wherein said control translates the determined motion of the target vehicle to the local coordinate system of the equipped vehicle using a relative longitudinal position of the target vehicle and a relative lateral position of the target vehicle.

14. A driver assistance system of a vehicle, said driver assistance system comprising:
   at least one camera configured to be disposed at a vehicle equipped with said driver assistance system so as to have a field of view exterior of the equipped vehicle;
   a control having an image processor operable to process frames of image data captured by said camera;
   wherein, with said at least one camera disposed at the equipped vehicle, said image processor processes frames of captured image data to determine a target vehicle present in the field of view of said camera and to determine motion of the determined target vehicle relative to the equipped vehicle;
   wherein said control, responsive to processing frames of captured image data via said image processor with said at least one camera disposed at the equipped vehicle, determines a path of travel of the determined target vehicle relative to the equipped vehicle as the equipped vehicle is moving;
   wherein said control translates the determined motion of the target vehicle to a local coordinate system of the equipped vehicle;
   wherein said control determines the relative path of travel of the determined target vehicle responsive to determined changes in location of the determined target vehicle relative to the equipped vehicle;
   wherein, responsive to processing frames of captured image data via said image processor with said at least one camera disposed at the equipped vehicle, said control determines a plurality of positions of the determined target vehicle along the determined path of travel of the determined target vehicle relative to the equipped vehicle as the equipped vehicle is moving;
   wherein the plurality of positions are stored in memory so a trajectory of the determined target vehicle can be determined; and
   wherein said control stores a position of the determined target vehicle only when the determined position of the target vehicle is at least a threshold distance from the previously stored position.

15. The driver assistance system of claim 14, wherein said control updates the local coordinate system of the equipped vehicle as the equipped vehicle moves.

16. The driver assistance system of claim 14, wherein, responsive to processing frames of captured image data via said image processor with said at least one camera disposed at the equipped vehicle, said control updates the determined motion of the target vehicle to the local coordinate system of the equipped vehicle as both the target vehicle and the equipped vehicle move so the determined motion of the target vehicle remains in the local coordinate system as the equipped vehicle moves.

17. The driver assistance system of claim 14, wherein, responsive to the determined motion of the target vehicle translated to the local coordinate system, said control maneuvers the equipped vehicle to follow the determined target vehicle.

18. A driver assistance system of a vehicle, said driver assistance system comprising:
   at least one camera configured to be disposed at a vehicle equipped with said driver assistance system so as to have a field of view exterior of the equipped vehicle;
   a control having an image processor operable to process frames of image data captured by said camera;
   wherein said control is operable to maneuver the equipped vehicle responsive to a GPS system of the equipped vehicle;
   wherein, with said at least one camera disposed at the equipped vehicle, said image processor processes frames of captured image data to determine a target vehicle present in the field of view of said camera and to determine motion of the determined target vehicle relative to the equipped vehicle;
   wherein said control, responsive to processing frames of captured image data via said image processor with said at least one camera disposed at the equipped vehicle, determines a path of travel of the determined target vehicle relative to the equipped vehicle as the equipped vehicle is moving;
   wherein said control translates the determined motion of the target vehicle to a local coordinate system of the equipped vehicle;
   wherein said control updates the local coordinate system of the equipped vehicle as the equipped vehicle moves; and
   wherein, responsive to loss of GPS system signal and responsive to the determined motion of the target vehicle translated to the local coordinate system, said control maneuvers the equipped vehicle to follow the determined target vehicle.

19. The driver assistance system of claim 18, wherein said control determines motion of the equipped vehicle via the equipped vehicle's velocity and yaw rate.

20. The driver assistance system of claim 18, wherein said control translates the determined motion of the target vehicle to the local coordinate system of the equipped vehicle using a relative longitudinal position of the target vehicle and a relative lateral position of the target vehicle.

* * * * *